Figure 1:
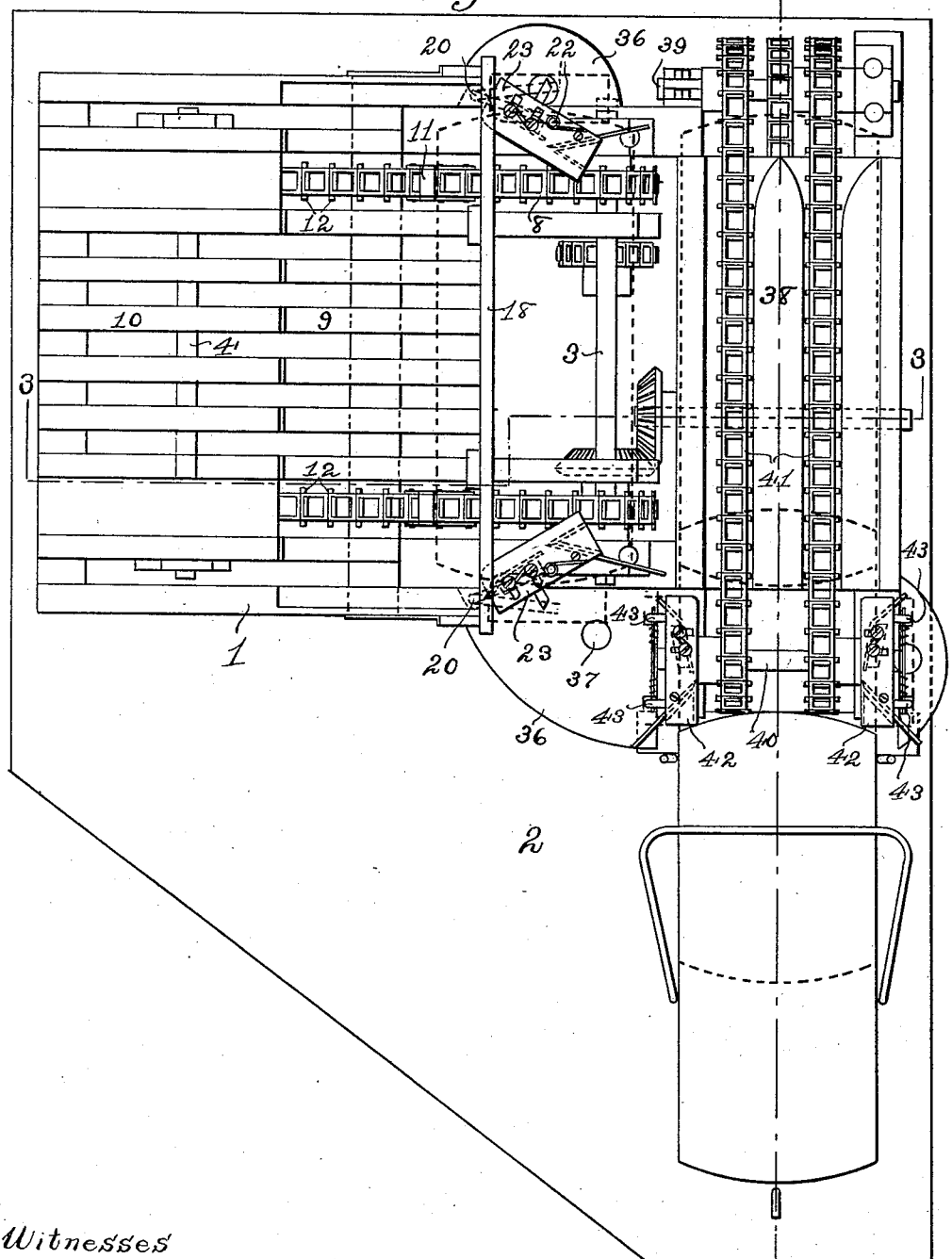

No. 855,836. PATENTED JUNE 4, 1907.
J. DION & J. D. BELANGER.
OIL CAKE TRIMMER.
APPLICATION FILED JUNE 3, 1901.

3 SHEETS—SHEET 1.

Witnesses
E. F. Wilson
John Snowhook

Inventors:
Joseph Dion
John D. Belanger
By Rudolph
Attorney

No. 855,836. PATENTED JUNE 4, 1907.
J. DION & J. D. BELANGER.
OIL CAKE TRIMMER.
APPLICATION FILED JUNE 3, 1901.
3 SHEETS—SHEET 2.
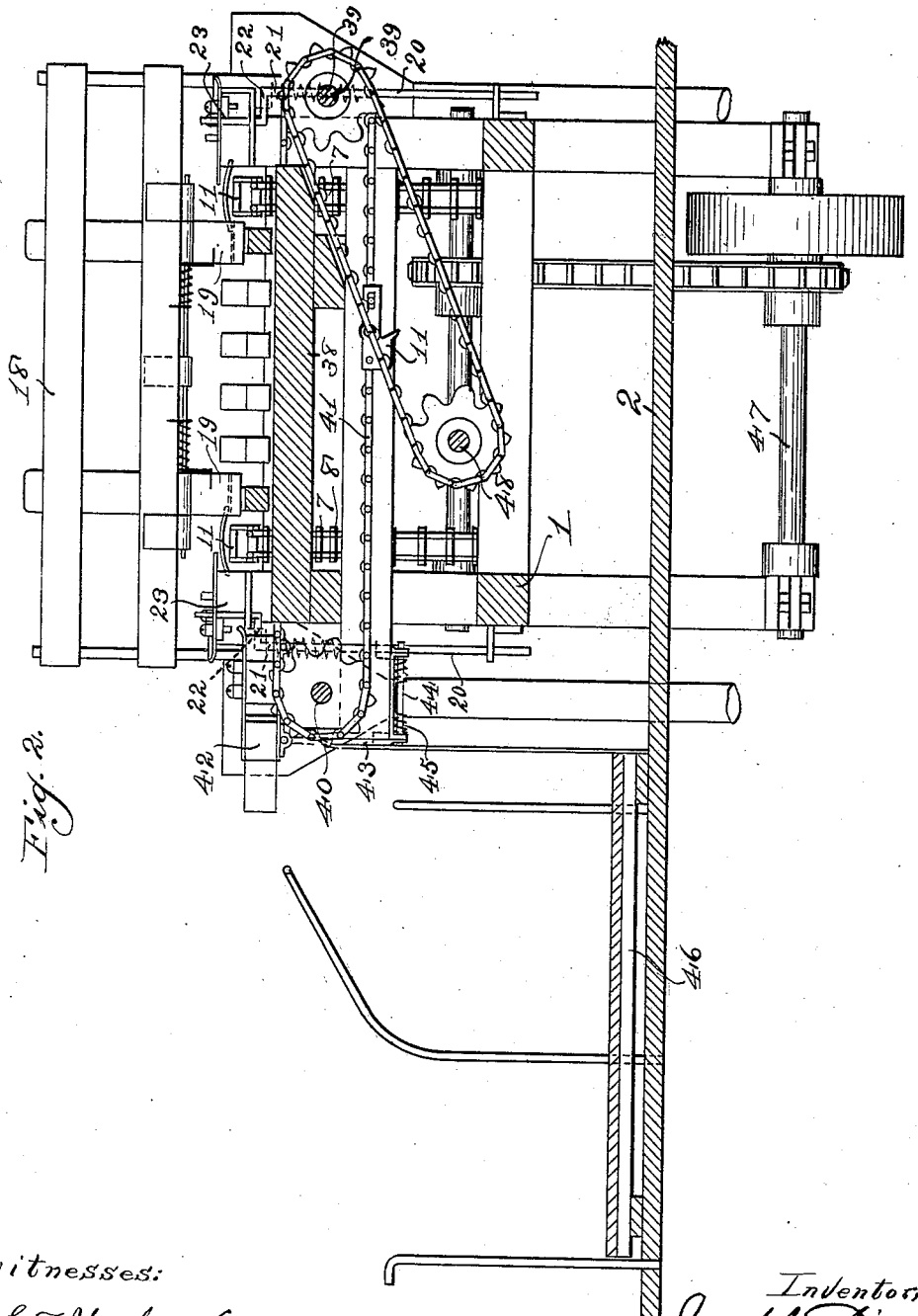

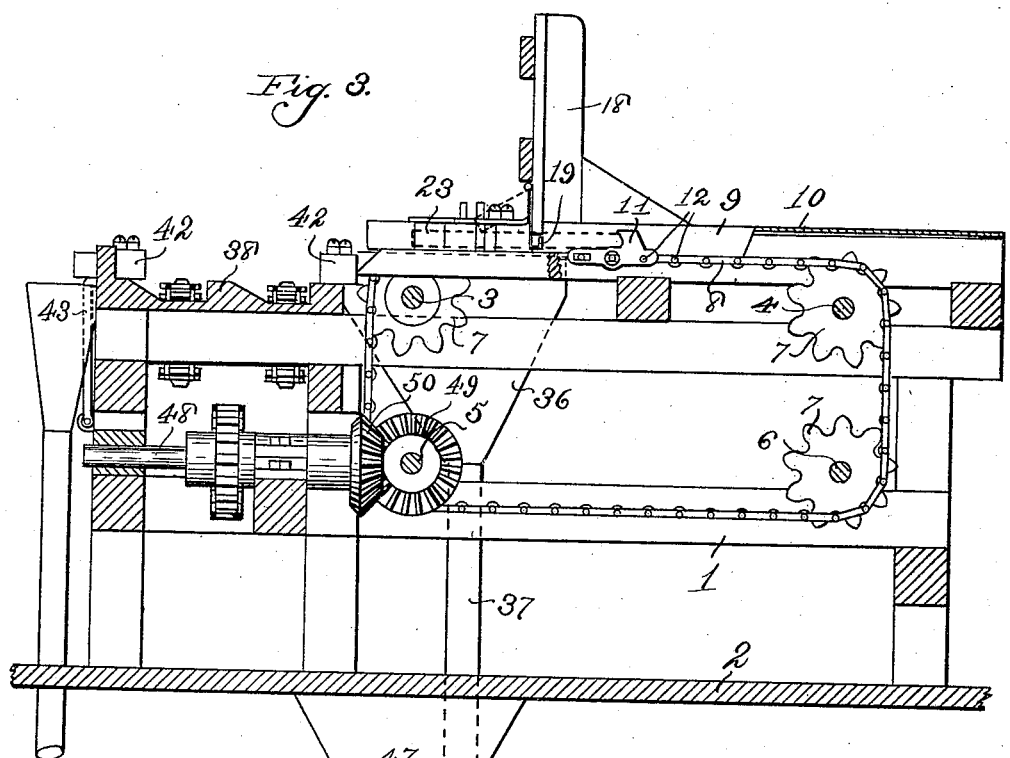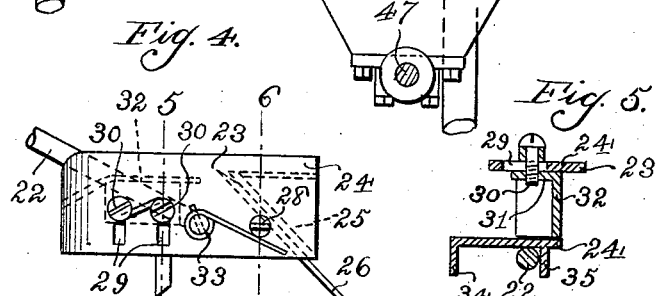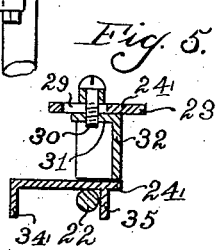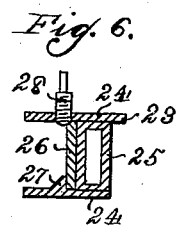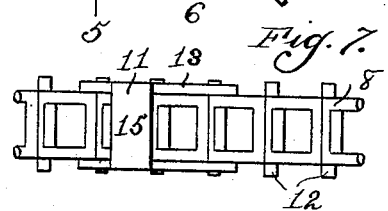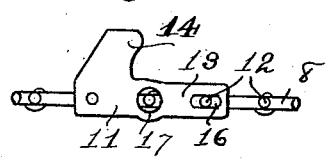

UNITED STATES PATENT OFFICE.

JOSEPH DION AND JOHN D. BELANGER, OF CHICAGO, ILLINOIS.

OIL-CAKE TRIMMER.

No. 855,836.　　　　　Specification of Letters Patent.　　　　　Patented June 4, 1907.

Application filed June 3, 1901. Serial No. 62,951.

*To all whom it may concern:*

Be it known that we, JOSEPH DION and JOHN D. BELANGER, citizens of the United States, residing at Chicago, in the county of Cook and State of Illinois, have invented certain new and useful Improvements in Oil-Cake Trimmers; and we do hereby declare the following to be a full, clear, and exact description of the invention, such as will enable others skilled in the art to which it appertains to make and use the same.

Our invention relates to a novel construction in an oil cake trimmer, the object being to provide a device by means of which the soft oily edges of linseed oil cake can be rapidly and neatly removed, and consists in the features of construction and combinations of parts hereinafter fully described and claimed.

In the accompanying drawings illustrating our invention: Figure 1 is a top plan view of a machine constructed in accordance with our invention. Fig. 2 is a vertical transverse section of same on the line 2—2 of Fig. 1. Fig. 3 is a vertical longitudinal section on the line 3—3 of Fig. 1. Fig. 4 is a detail top plan view of one of the trimming knives. Figs. 5 and 6 are sections on the line 5—5 and 6—6 of Fig. 4 respectively. Figs. 7 and 8 are respectively a detail top plan view and a side elevation of the sprocket chain and hooks for carrying the cake through the machine.

Our machine comprises a frame 1, preferably mounted on a platform 2, and carrying bearings in which are journaled four shafts 3, 4, 5 and 6 each carrying a pair of sprocket wheels 7 over which sprocket chains 8 are trained. Above said shafts 3 and 4 is a table 9 the rear end of which is raised as at 10. The oil cake is stripped by hand upon the raised portion 10 of said table and is then laid upon the main portion 9 where it is engaged by hooks 11 on said sprocket chains 8 and transported as hereinafter described. The links of said sprocket chains 8 are provided with projecting lugs 12 and upon such lugs said hooks 11 are mounted. The latter consist each of two plates 13 each having a raised overhanging portion 14 and secured together by means of the cross-piece 15. Each of said plates is provided at one end with a perforation entered by one of said lugs and at its other end with a slot 16 entered by a lug on another link. Said plates are each provided between their ends with a large circular opening 17 in which an intervening lug is freely movable. Extending above said table 9 is a frame 18 to which two spring-actuated levers 19 are pivotally secured. The lower ends of said levers 19 extend into the path of the oil cake and are forced out of such path by the oil cake which they act to hold down upon the table and in the path of planes hereinafter fully described. The portion of said frame 18 above said lower end of said aprons, acts as a stop to prevent more than one oil cake from passing through the machine at one time. Pivotally mounted on each side of said table 9 below said frame 18 are two vertical crank-shafts 20 engaged by spiral springs 21 to normally hold the horizontal arm 22 of each normally at the inner limit of its movement with relation to said table 9. Said arms 22 each carry what we term a trimming plane 23 which is pivotally mounted thereon. Each of said planes 23 consists of two parallel horizontal plates 24 connected together by a vertical V-shaped plate 25 at one end, one leg of which extends parallel with the inner edges of said plates 24 while the other extends at an angle of about forty-five degrees thereto. A knife 26 rests with one face against the angular leg of said plates 25 and is held in position by means of a shoulder 27 on the lower plate 24 and a set-screw 28 mounted is the upper plate 24. Said upper plate 24 is provided with two parallel transverse slots 29 through which set-screws 30 pass which enter screw-threaded openings in the flange 31 of a plate 32 which is thus adjustably mounted between said plates 24, and extends parallel to the inner edges of the latter, its forward end being bent back to avoid bringing said end in contact with the oil cake.

The end of the crank arm 22 is bent upwardly and passes through both said plates 24, its upper end being engaged by a spring 33 engaging the set-screw 28 to normally hold said plane in the position indicated in full lines in Fig. 1, with relation to said crank arm. The lower plate 24 carries two stops 34 and 35 which limit the pivotal movements of said plane with relation to said crank arm.

The oil cake in passing, engages the forward end portions of the planes, thereby turning same on their pivots and automatically adjusting them so that the knives thereof engage the forward ends of the cake and then follow the contour of the latter, thereby cutting off strips of given width from the ends. The portion of the oil cake cut off is the soft oily edge portion which is displaced during the hydraulic compression of the cake and said edge portions are returned to the press and again compressed into cakes. The strips cut off by said planes drop into receivers 36 whence they pass through tubes 37 to any desired receptacle or carriers.

The cakes after passing between the planes are carried to the end of table 9 whence they drop upon a second slightly lower table 38. The latter is provided at its ends with bearings in which shafts 39 and 40 are journaled, each of which carries sprocket wheels over which a second pair of sprocket chains 41 are trained, said chains 41 being of the same construction as the sprocket chains 8 and carrying similar hooks 11 which engage one end of the cake and carry same between a similar pair of planes 42 located one at each side of said table and mounted upon the upper ends of arms 43 pivotally mounted upon shafts 44 mounted upon the frame 1 below said table 38. Said arms 43 are actuated by springs 45 to hold the said planes 42 normally in the path of the oil cake. Oil cakes are generally of oblong shape, the long edges being parallel and the short edges rounded or convex. Hence, it is unnecessary that said planes 42 for trimming the long edges should have a pivotal motion in a horizontal plane as is essential with the planes 23 for trimming the rounded ends of the cake.

As the cake passes between the planes 42 the long edges of same are trimmed and the cakes then delivered to a receiving frame 46 of any suitable construction.

Our machine is driven by means of a driveshaft 47 below the platform 2 which is geared to the shaft 5 by means of sprocket chains and wheels, and said shaft 5 is in turn geared to a shaft 48 by means of bevel gears 49 and 50. The said shaft 48 is in turn geared to the shaft 39 by means of sprocket wheels and chain.

Our device is very simple and efficient and saves a great deal of labor.

The particular forms of construction, and the size, proportion and arrangement of parts, above described and set out in the drawing, are to be understood as capable of more or less variation without departing from the spirit of our invention and they are to be taken simply as illustrative of the invention.

The table consists of two parts, one the upper level and the other the depressed portion shaped somewhat like the outlines of the cakes to be treated. This depressed portion is associated with a frame, which prevents any but the lower cake from passing under it, and the passage of the lower cake is resisted by downwardly projecting spring parts, which however give way and then serve as presser hands on the upper part of the cake to hold it down in position as it passes along the table. The hooks which engage the rear edge of the cake to pull it forward are arranged as shown, being pivotally secured at one end on the cross piece which holds two links of the sprocket chain together. These hooks are secured midway on a like cross piece, but in large openings, and at the other end on a like cross piece by means of a slot. Thus, these hooks are given a length greater than that of a single link, or even two links in the chain, and are yet arranged so as to freely pass around the sprocket wheels. This forwardly projecting portion of the hooks is arranged to receive the under part of the rear portion of the cake at the time when it is about to be engaged by the hooks, and thus a certain grip or hold of the cake is obtained, it being clamped in a certain sense between the hook proper and the forwardly projecting part thereof, as is indicated in Fig. 3.

The planes or cutters for removing the edges of the cake are pivoted upon an arm, which is itself pivoted, and the arm is elastically forced toward the cake. The plane itself is elastically supported, so that it may swing slightly on its pivot, while at the same time being held in comparative parallelism with the cake, whatever the position of the supporting arm may be as varied by the size or width of such cake. This arrangement of the cutter or plane is such as to make it perform its functions effectually without regard to the width of the cake, and without regard to the irregularities of the cake, and to cut along the edge of such cake by a somewhat irregular path such as is proper to remove the somewhat irregularly projecting portions of the oil cake. The cutters or planes which operate against the longer sides of the cake on the second table are not mounted in the same way, but it is obvious that the same kind of cutter could be used there as is used in the other case. This cutter and the method of mounting it is an important part of the invention.

We claim as our invention:

1. An oil cake trimmer, comprising a table, a carrier adapted to move the oil cake over said table, vertical crank shafts mounted on said table on each side of said carrier, a plane pivotally mounted on the crank of each of said crank shafts and swinging in a horizontal plane, and springs actuating said crank shafts to hold said planes in the path of the edges of the oil cake.

2. An oil cake trimmer, comprising a carrier adapted to transport the oil cake, planes movably mounted on the frame of the machine on each side of the carrier, and springs for holding the said planes in the path of the oil cake, said planes being provided with guard-plates adapted to be engaged by the edges of the cake to determine the depth of the cut effected by said planes, said planes mounted so as to have a long bearing against the side of the cake on both sides of the cutting edge.

3. In an oil cake trimmer, the combination with a carrier and cutters on each side thereof adapted to trim the edges of the cake as same is carried between the same, of hooks on said carrier, adapted to engage the edge of the cake to force same through between said cutting devices, and means for forcing said cake into proper position on said carrier, comprising a spring-actuated gate depending into the path of the cake in advance of said cutters and adapted to be engaged by said cake to force the rear edge thereof firmly against said hooks, said gate being pivotally moved by the cake as same passes and pressing upon said cake as the latter passes between said cutters to prevent same from springing out of engagement with the latter.

4. In an oil cake trimmer, the combination with a carrier and cutters on each side thereof adapted to trim the edges of the cake as same is carried between the same, of hooks on said carrier, adapted to engage the edge of the cake to force same through between said cutting devices, and means for forcing said cake into proper position on said carrier, comprising a spring-actuated gate depending into the path of the cake in advance of said cutters and adapted to be engaged by said cake to force the rear edge thereof firmly against said hooks, said gate being pivotally moved by the cake as same passes.

5. In an oil cake trimmer, the combination of a suitable table for receiving the cakes, with carriers for moving them along the table, a plane-like cutter at the side of such table, consisting of a knife set at an inclination to the line of travel of the cake, and a device for elastically pressing such knife against the edge of the cake said cutter adapted to continuously engage the edge of the cake from end to end as the cake passes on.

6. In an oil cake trimmer, the combination of a suitable table for receiving the cakes, with carriers for moving them along the table, a plane-like cutter at the side of such table, consisting of a knife set at an inclination to the line of travel of the cake and mounted on an arm pivoted so as to oscillate to and from the edge of the cake, and an elastic device to force the arm and knife elastically toward the edge of the cake said cutter adapted to continuously engage the edge of the cake from end to end as the cake passes on.

7. In an oil cake trimmer, the combination of a suitable table for receiving the cakes, with carriers for moving them along the table, a plane-like cutter at the side of such table, consisting of a knife set at an inclination to the line of travel of the cake, said knife pivoted on its support, and an elastic device to press the knife and its support toward the edge of the cake said cutter adapted to continuously engage the edge of the cake from end to end as the cake passes on.

8. In an oil cake trimmer, the combination of a suitable table for receiving the cakes, with carriers for moving them along the table, a plane-like cutter at the side of such table, consisting of a knife set at an inclination to the line of travel of the cake, pivoted on its support and provided with an elastic device, which tends to move it about its pivot said cutter adapted to continuously engage the edge of the cake from end to end as the cake passes on.

9. In an oil cake trimmer, the combination of a suitable table for receiving the cakes, with carriers for moving them along the table, a cutter at the side of such table, consisting of a knife set at an inclination to the line of travel of the cake, pivoted on its support and provided with an elastic device, which tends to move it about its pivot, and an elastic device which tends to move the knife and its support toward the edge of the cake.

10. In an oil cake trimmer, the combination of a table on which the cakes are received, with traveling conveyer chains, provided with hooking devices, each of said devices consisting of a part adapted to engage the rear edge of the cake and a forwardly projecting part adapted to receive the lower side of the cake near its rear edge, said hooking device secured on the traveling chain by loose pivotal connections and being longer than two sections or links of the chain.

11. In an oil cake trimmer, the combination with a table and a carrier adapted to move oil cakes over said table, of devices for trimming the rounded edges of said cake, comprising vertical crank shafts mounted on said table on each side of said carrier, a plane pivotally mounted on the crank of each of said crank shafts and adapted to turn horizontally, and springs actuating said crank shafts for holding said planes in the path of the cake, said planes being thereby adapted to follow the contour of the edges of said cake and trim the same.

12. The combination of a feed table, means for moving the cakes over the table, a cutter associated with the table and means for controlling the position of the cutter so as to vary the cut, such means comprising a surface against which the cake presses in passing the cutter so as to move such cutter in accordance with the contour of such surface and the shape of the cake being trimmed.

13. In an oil cake trimmer, the combination of a feed table, means for moving the cake to be trimmed over the table, a plane like cutting tool normally idle against which the cake is pressed to make the cut, and a tension device to hold the edge of the cutting tool yieldingly in the cake.

14. In an oil cake trimmer, the combination of a feed table, means for moving the cake to be trimmed over the table, a cutter comprising a normally stationary knife or blade against which the cake is pressed so as to cut a slice from its edge, and a tension device to hold such blade or knife in the cake so that it follows the edge of the hard part thereof.

In testimony whereof we affix our signatures, in presence of two witnesses.

JOSEPH DION.
JOHN D. BELANGER.

Witnesses:
  RUDOLPH WM. LOTZ,
  JOHN SNOWHOOK.